US010901998B2

(12) United States Patent
Eidem et al.

(10) Patent No.: US 10,901,998 B2
(45) Date of Patent: Jan. 26, 2021

(54) MANAGING A MODIFICATION TO A CONSISTENT REGION OF A STREAM COMPUTING ENVIRONMENT

(71) Applicant: International Business Machines Corporation, Armonk, NY (US)

(72) Inventors: Jessica R. Eidem, Rochester, MN (US); Brian R. Muras, Otsego, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 15/168,379

(22) Filed: May 31, 2016

(65) Prior Publication Data

US 2017/0344600 A1    Nov. 30, 2017

(51) Int. Cl.
*G06F 16/2455*    (2019.01)
(52) U.S. Cl.
CPC .............. *G06F 16/24568* (2019.01)
(58) Field of Classification Search
CPC .................. G06F 16/215; G06F 16/24568
See application file for complete search history.

(56) References Cited

U.S. PATENT DOCUMENTS

| | | | |
|---|---|---|---|
| 6,681,230 B1* | 1/2004 | Blott | G06F 8/38 |
| 7,593,947 B2 | 9/2009 | Nagai et al. | |
| 9,369,431 B1* | 6/2016 | Kirby | H04L 63/02 |
| 2008/0027895 A1* | 1/2008 | Combaz | G06F 16/335 |
| 2008/0134158 A1* | 6/2008 | Salz | G06F 8/34 |
| | | | 717/148 |
| 2009/0125635 A1* | 5/2009 | Barga | G06F 11/0721 |
| | | | 709/231 |
| 2012/0084317 A1* | 4/2012 | Sakamoto | G06Q 40/04 |
| | | | 707/769 |

(Continued)

FOREIGN PATENT DOCUMENTS

CN    104317556 A    1/2015

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.

(Continued)

*Primary Examiner* — James Trujillo
*Assistant Examiner* — J Mitchell Curran
(74) *Attorney, Agent, or Firm* — Stephen R. Yoder

(57) ABSTRACT

Disclosed aspects relate to managing a stream computing environment. The stream computing environment may have a consistent region that includes a set of stream operators for processing a stream of tuples. An operator modification request with respect to the set of stream operators of the consistent region of the stream computing environment may be received. In response to receiving the operator modification request, a set of tuples of the stream of tuples may be detected in the consistent region. Using the operator modification request, a tuple adjustment action for the set of tuples of the stream of tuples in the consistent region may be determined. Based on the operator modification request, the set of stream operators may be modified. The set of tuples may be processed using the tuple adjustment action.

20 Claims, 10 Drawing Sheets

(56) References Cited

U.S. PATENT DOCUMENTS

| | | | | |
|---|---|---|---|---|
| 2013/0198318 A1* | 8/2013 | Branson | ................ | G06F 9/5011 709/217 |
| 2014/0278337 A1* | 9/2014 | Branson | .................. | G06F 30/33 703/22 |
| 2014/0289240 A1* | 9/2014 | Barsness | ........... | G06F 16/24568 707/736 |
| 2015/0143365 A1* | 5/2015 | Bragstad | ............. | G06F 9/45533 718/1 |

OTHER PUBLICATIONS

STREAMS: Dynamic Operator Highlighting in a Streaming Environment <http://priorart.ip.com/IPCOM/000245483D>.

International Business Machines Corporation; "IBM InfoSphere Streams Version 4.1.1: Output ports"; <http://www.ibm.com/support/knowledgecenter/en/SSCRJU_4.1.1/com.ibm.streams.ref.doc/doc/outputports.html?view=embed>.

International Business Machines Corporation; "IBM InfoSphere Streams Version 4.1.1: Input ports"; <http://www.ibm.com/support/knowledgecenter/en/SSCRJU_4.1.1/com.ibm.streams.ref.doc/doc/inputports.html?view=embed>.

Wolf et al., "On-the-Fly Adaptation of Data Stream Queries," ISORC 2010, IEEE Computer Society, pp. 175-179, 2010.

Moga et al., "UpStream: A Storage-Centric Load Management System for Real-Time Update Streams," Proc. of the VLDB Endowment, v.4, n.12, pp. 1442-1445, 2011.

Toshniwal et al., "Storm @Twitter," SIGMOD'14, Jun. 2014, ACM, pp. 147-156, 2014.

Van Melle, Benjamin, "High Availability for RoQ Core Components," Thesis, Université Catholique de Louvain-la-Neuve, Belgium, 2015.

Kulkarni et al., "Twitter Heron: Stream Processing at Scale," SIGMOD'15, Jun. 2015, ACM, pp. 239-250, 2015.

* cited by examiner

1000

Begin 1001

↓

Receive operator modification request
1010

↓

Detect a set of tuples
1030

↓

Determine a tuple adjustment action
1050

↓

Modify the set of stream operators
1070

↓

Process the set of tuples
1090

Receiving
1092

Processing
1094

↓

Done 1099

MANAGING A MODIFICATION TO A CONSISTENT REGION OF A STREAM COMPUTING ENVIRONMENT

BACKGROUND

This disclosure relates generally to computer systems and, more particularly, relates to managing a stream computing environment which has a consistent region that includes a set of stream operators for processing a stream of tuples. The amount of stream computing data that needs to be managed by enterprises is increasing. Management of stream computing environments may be desired to be performed as efficiently as possible. As stream computing data needing to be managed increases, the need for stream computing environment management efficiency may increase.

SUMMARY

Aspects of the disclosure relate to managing stream operators in a stream computing environment. Tuple capture and replay techniques may be used to process tuples by updated operators within the consistent region of a streaming environment. In the event of a change to operators or processing elements in a consistent region, tuples may be replayed through the operators of the consistent region to facilitate tuples exiting the consistent region in following the behavior defined by the updated operators of the streaming environment. Live switchover techniques may be utilized for efficiency. When multiple operators from different areas of the same consistent regions are updated, tuples may be identified for replay through the updated operators. In the event of an error, some operators may be rolled back to pre-update configurations. Different techniques may be employed based on the type of the tuples and the nature of the operator update. Processing or reprocessing of tuples in a consistent region may be associated with stream application performance or efficiency.

Aspects of the disclosure relate to managing a stream computing environment. The stream computing environment may have a consistent region that includes a set of stream operators for processing a stream of tuples. An operator modification request with respect to the set of stream operators of the consistent region of the stream computing environment may be received. In response to receiving the operator modification request, a set of tuples of the stream of tuples may be detected in the consistent region. Using the operator modification request, a tuple adjustment action for the set of tuples of the stream of tuples in the consistent region may be determined. Based on the operator modification request, the set of stream operators may be modified. The set of tuples may be processed using the tuple adjustment action.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 10 is a flowchart illustrating a method for managing a set of tuples in a consistent region, according to embodiments.

Figure 1:
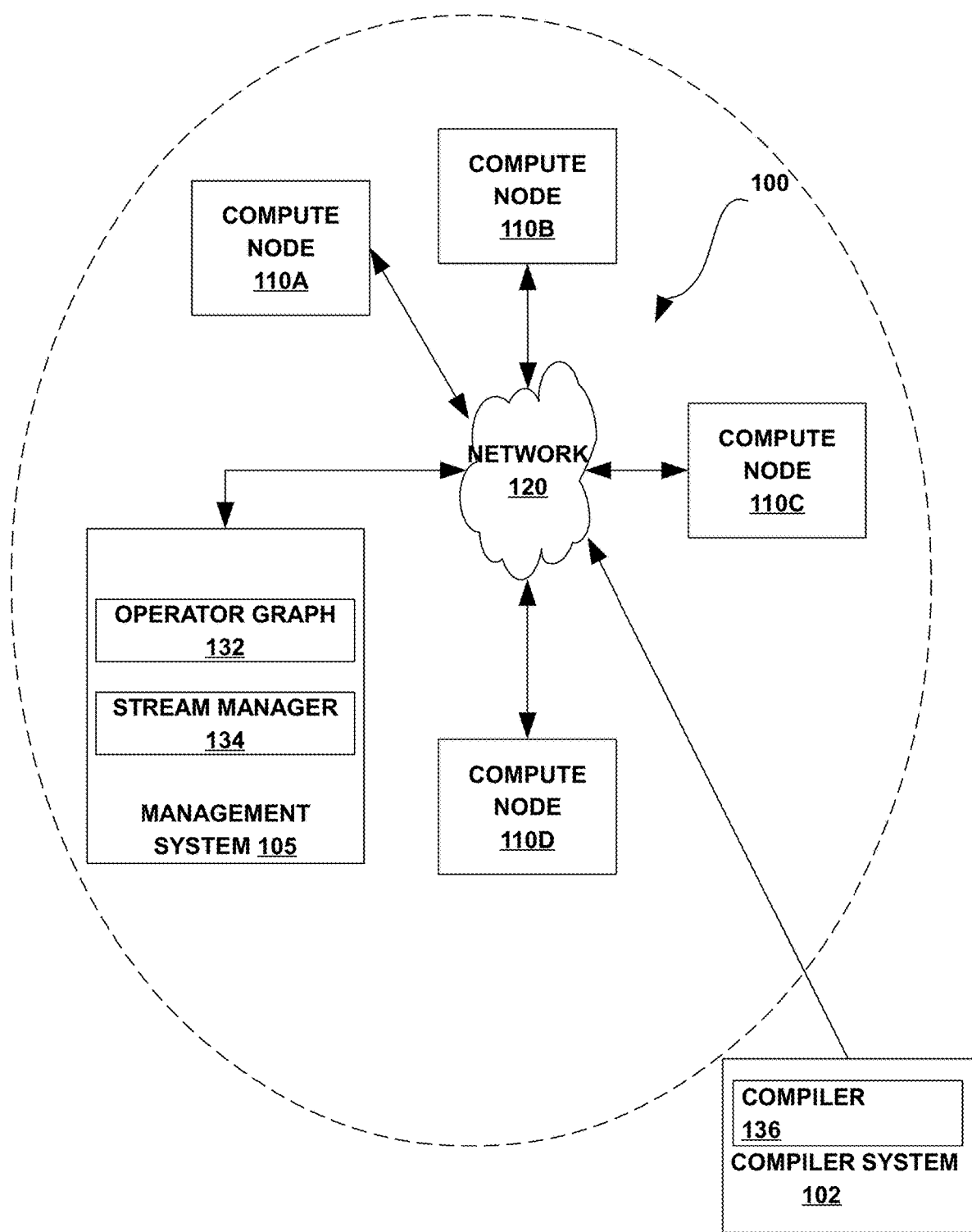
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing stream operators in a stream computing environment. Tuple capture and replay (e.g., reprocessing) techniques may be used to guarantee processing of tuples by updated operators within the consistent region of a streaming environment. In the event of a change (e.g., recompiling, code fixes, patches) to operators or processing elements in a consistent region, tuples may be replayed through the operators of the consistent region to guarantee that all tuples exiting the consistent region follow new behavior defined by the updated operators of the streaming environment. Live switchover techniques may also be utilized to reduce tuple loss. In the case that multiple operators from different areas of the same consistent regions are updated, tuples may be identified for replay through the updated operators. In the event of an error, some operators may be rolled back to pre-update configurations (e.g., to ensure stability). Different techniques may be employed based on the type of the tuples and the nature of the operator update. Processing or reprocessing of tuples in a consistent region may be associated with stream application performance and efficiency.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using interprocess communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for stream operator management. A stream operator which operates on a computer processor and corresponds to a processing element for processing a stream of tuples may be analyzed. In embodiments, analyzing the stream operator may include evaluating historical performance data or monitoring the running performance of the stream operator. Based on the analysis of the stream operator, a set of profile data for the stream operator may be determined. The set of profile data for the stream operator may be established for utilization to develop a streaming application. In embodiments, establishing the set of profile data may include providing the set of profile data for the stream operator in an integrated development environment or constructing implementation code. Altogether, performance or efficiency benefits with respect to stream application development and stream computing may occur (e.g., speed, flexibility, ease of development, resource usage, productivity.) Aspects may save resources such as user time, computer bandwidth, memory, and processing resources.

FIG. 1 illustrates one exemplary computing infrastructure 100 that may be configured to execute a stream computing application, according to some embodiments. The computing infrastructure 100 includes a management system 105 (which can include an operator graph 132 and a stream manager 134) and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
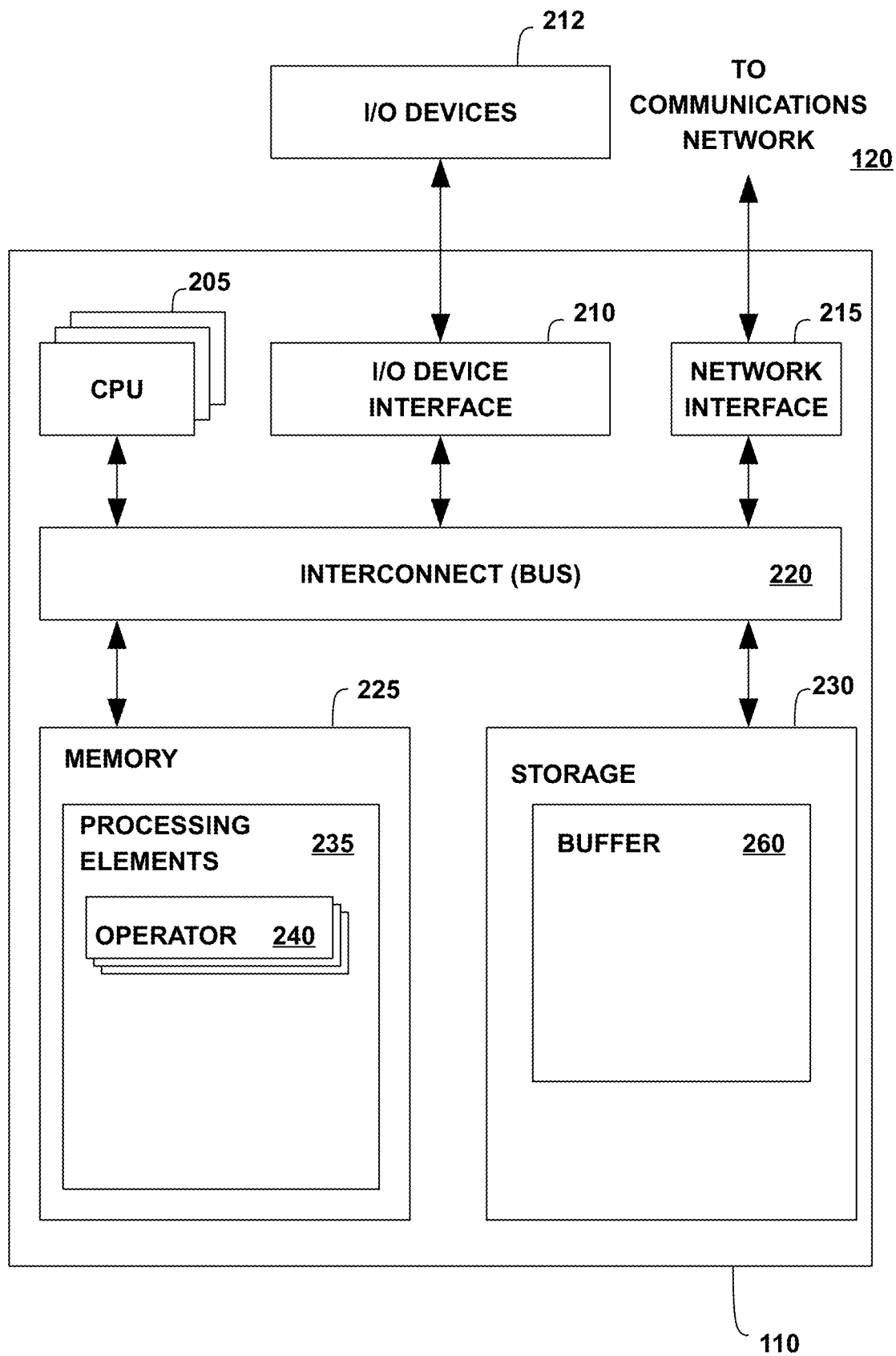
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
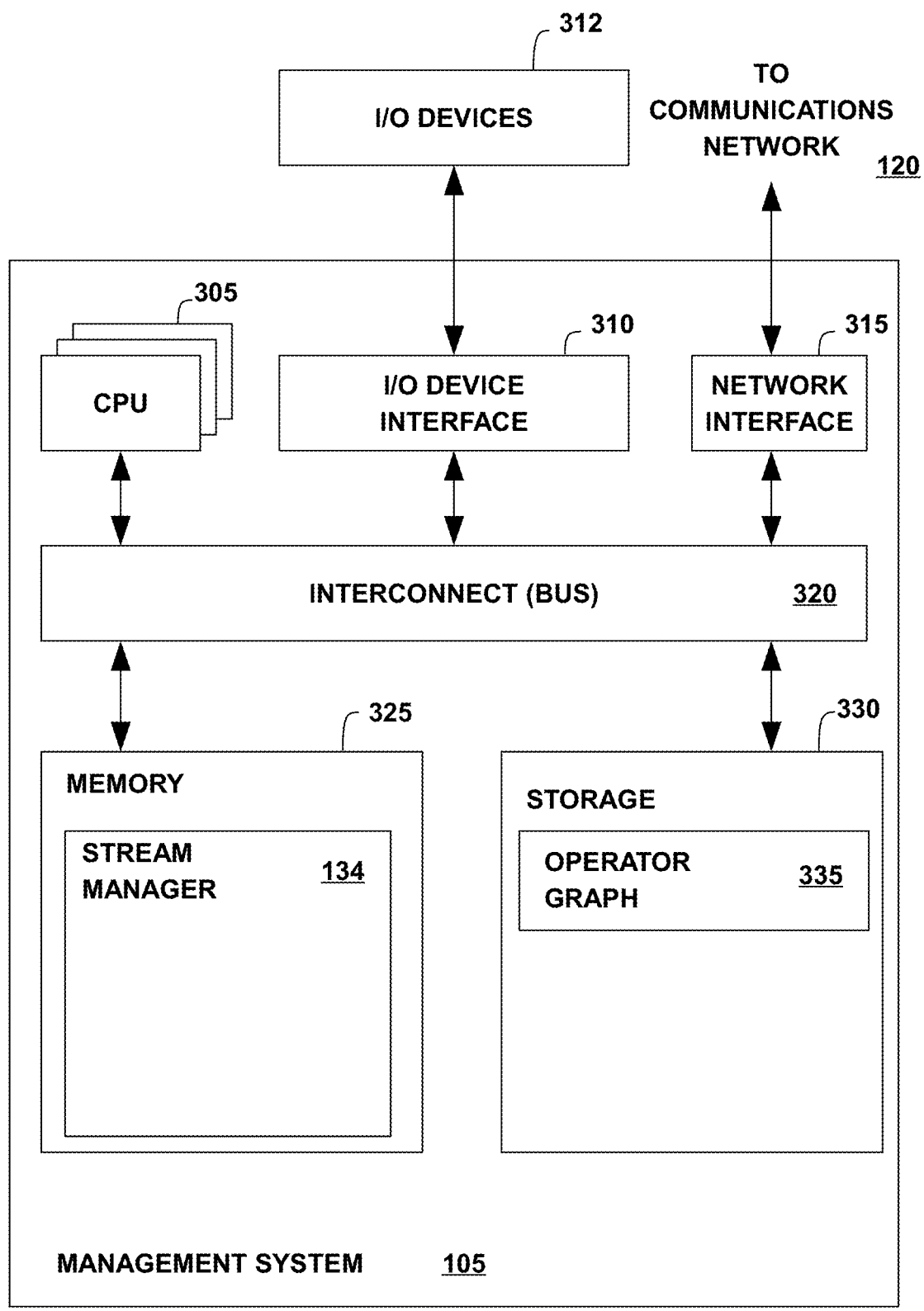
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function. Portions of stream manager 134 or operator graph 335 may be stored in memory 325 or storage 330 at different times in various embodiments.

Figure 4:
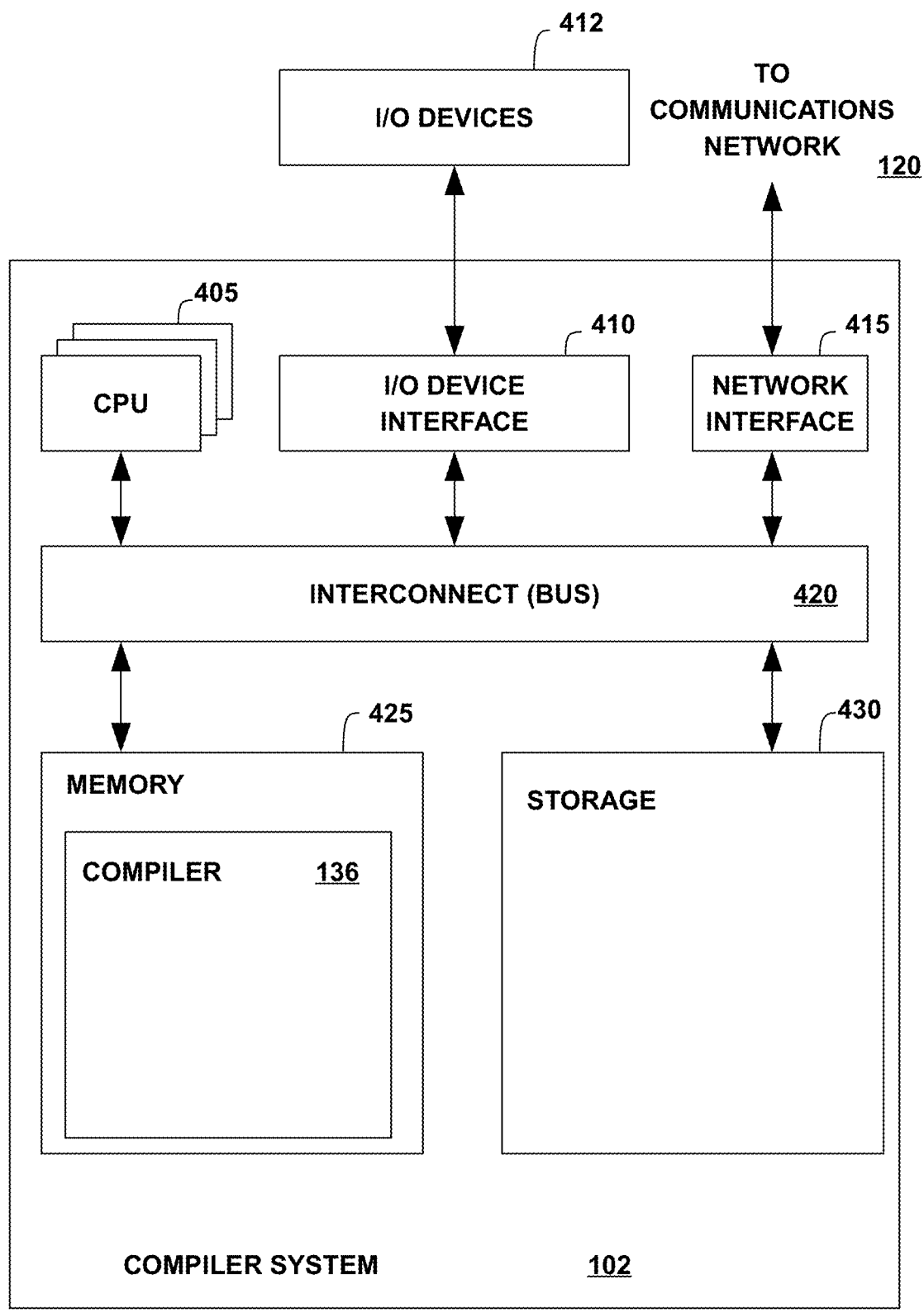
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
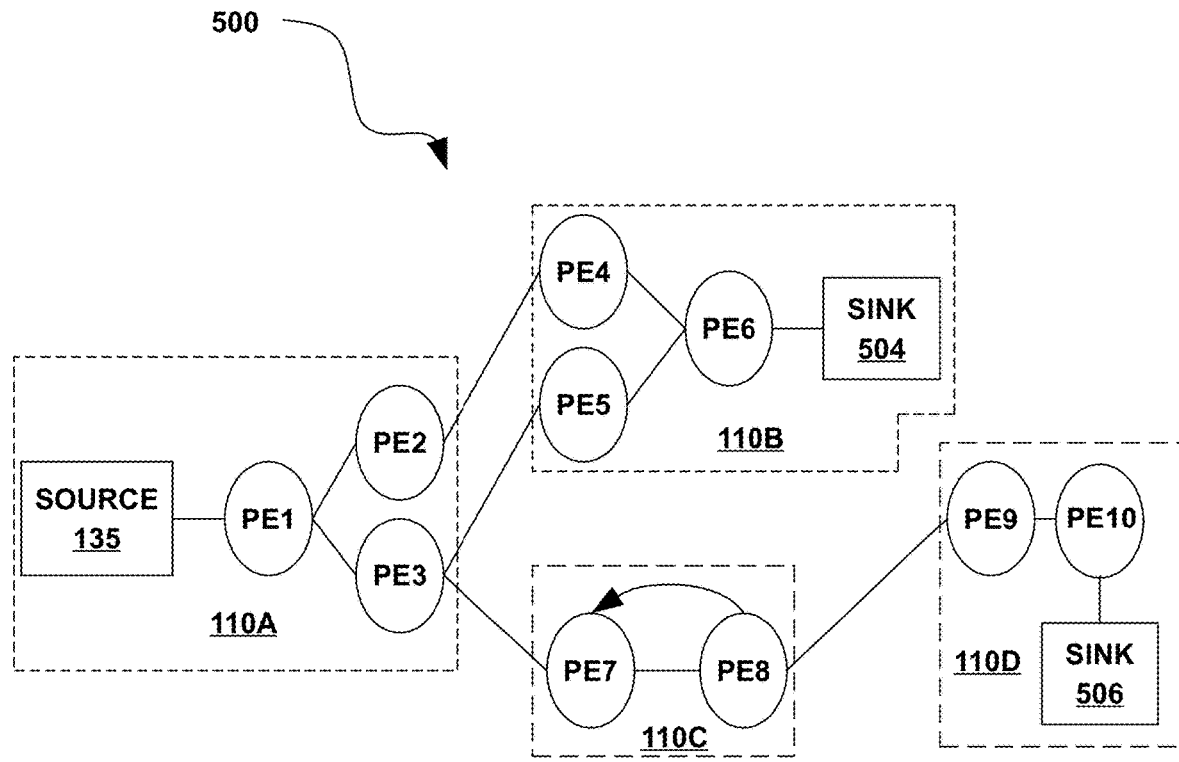
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 and to operator sink 504. Similarly, tuples flowing from PE3 to PE5 and to PE6 also reach the operators in sink 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
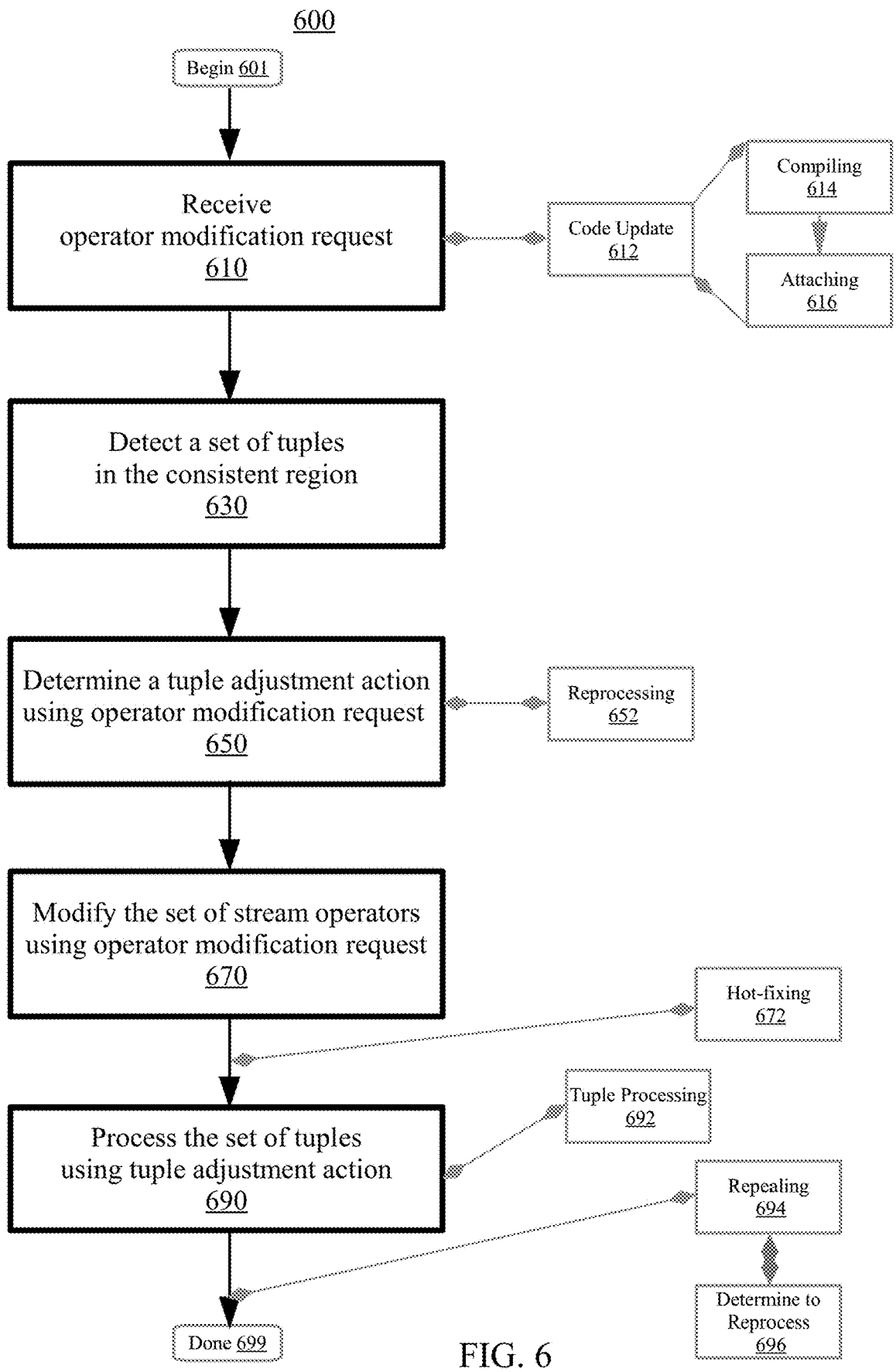
FIG. 6 is a flowchart illustrating a method for managing a stream computing environment, according to embodiments.

FIG. 6 is a flowchart illustrating a method 600 for managing a stream computing environment, according to embodiments. The stream computing environment may have a consistent region that includes a set of stream operators for processing a stream of tuples. The set of stream operators may include processing elements configured to perform operations (e.g., logic-based analysis, attribute modification) on data (e.g., tuples) as part of a stream computing application. In embodiments, the set of stream operators may be part of the consistent region. Aspects of the disclosure relate to managing the set of operators using a tuple adjustment action based on an operator modification request. Method 600 may begin at block 601.

At block 610, an operator modification request may be received with respect to the set of stream operators of the consistent region of the stream computing environment. Generally, receiving can include collecting, gathering, obtaining, detecting, or otherwise accepting delivery of the operator modification request. In embodiments, receiving the operator modification request may include detecting a notification of a pending update with respect to one or more operators of the consistent region. As an example, the stream computing environment may detect a transmission from an update scheduling module that indicates a system-wide firmware update is scheduled for implementation, and that one or more stream operators of the set of stream operators may be affected. In embodiments, the operator modification request can include a notification, query, or alert that indicates a change, revision, alteration, fix, or other modification with respect to one or more stream operators. As examples, the operator modification request may include a notification of an operator code revision, code recompilation, repair operation, firmware patch/update, or other configuration change with respect to the stream computing environment. The operator modification request may designate one or more particular operators of the set of operators (e.g., a subset of the set of operators) to be added, removed, reconfigured, or otherwise modified. In embodiments, the operator modification request may be received from an internal processing component of the stream computing environment (e.g., firmware update management module). In embodiments, the operator modification request may be received from another system component communicatively connected with the stream computing environment (e.g., system task manager). Other methods of receiving the operator modification request are also possible.

In embodiments, an update for a set of operating code may be initiated at block 612. The update for the set of operating code may be applied to a subset of the set of stream operators. The subset of the set of stream operators may include one or more stream operators that are specified or designated as potentially being affected (e.g., deliberately targeted or incidentally impacted) by the update. Generally, the update for the set of operating code may include an alteration, revision, modification, or other change to the programming code that governs the behavior and configuration of the subset of the set of stream operators. For instance, the update may include recompiling the operating code for the subset of stream operators, applying a firmware patch, changing one or more operating parameters, or performing another type of modification with respect to the subset of stream operators. As an example, the code update may include revising the firmware version of the subset of stream operators from Version 3.07 to Version 3.52 (e.g., to increase tuple processing speed). Other types of code update with respect to the subset of the set of stream operators are also possible.

In embodiments, the subset of the set of stream operators may be compiled at block 614. Generally, compiling can include the translation, conversion, or transformation of a set of programming code (e.g., of the subset of stream operators) into a target programming language (e.g., from a high-level programming language to a lower-level programming language such as assembly language or machine code) using a compiler. In embodiments, compiling may include converting the stream operator into an executable processing element. For instance, compiling the stream operator may include converting a stream operator of the subset of stream operators from a first programming language to a second program language to facilitate operation of the operator within the stream computing environment. Other methods of compiling the subset of the set of stream operators are also possible.

In embodiments, a set of input-output ports may be attached for the subset of the set of stream operators at block 616. Generally, attaching the set of input-output ports for the subset of the set of stream operators may include configuring the input and output parameters of the subset of stream operators with respect to the set of tuples. In embodiments, attaching the set of input-output ports may include constructing the operating code of the subset of stream operators to define the behavior for receiving and transmitting tuples. For instance, attaching the set of input-output ports can include specifying how tuples are to be modified upon reception or transmission, designating window punctuation parameters for each port, defining custom input/output logic functions, or otherwise establishing the input and output processing behavior of the subset of stream operators. As examples, attaching the set of input-output ports may include selecting one or more parameters for an input port element such as "tuplemutation," "controlport," and "windowexpressionmode," and one or more parameters for an output port element such as "autoassignment," "rewriteallowed," and "outputfunctions." Other methods of attaching the set of input-output ports are also possible.

At block 630, a set of tuples of the stream of tuples may be detected. The set of tuples of the stream of tuples may be detected in the consistent region of the stream computing environment in response to receiving the operator modification request. Generally, detecting can include monitoring, discovering, tracking, recognizing, recording, or otherwise identifying the set of tuples. In embodiments, the set of tuples can include the tuples that are located within the consistent region, and the stream of tuples can include both the tuples inside the consistent region and those tuples outside the consistent region. In embodiments, detecting the set of tuples may include examining the consistent region of the stream computing environment to determine information regarding the number of tuples located within the consistent region as well as attributes such as the type, behavior, and other characteristics of the set of tuples. As an example, in response to receiving the operator modification request, a stream traffic diagnostic tool may be used to inspect the tuples included in the consistent region. In embodiments, information regarding the characteristics of the set of tuples may be gathered and recorded in a streaming log. For instance, information regarding which stream operators a particular tuple has been processed by, as well as the tuples' location within the consistent region, may be collected and stored in the streaming log for subsequent use (e.g., to facilitate processing of the set of tuples). Other methods of detecting the set of tuples in the consistent region are also possible.

Consider the following example. In response to receiving the operator modification request, a stream traffic diagnostic tool may initiate examination of the consistent region. The stream traffic diagnostic tool may be configured to dynamically collect data about the tuples in real-time as the tuples flow through the consistent region. In embodiments, the stream traffic diagnostic tool may be configured to capture a snapshot of the consistent region at a particular instant of time. As an example, the stream traffic diagnostic tool may identify that 19 tuples are located within the consistent region, and collect information indicating the position (e.g., in processing at operator C), type, source, destination, exit order relevance, and other attributes for each tuple. In embodiments, each tuple may be tagged to indicate which stream operators it has been processed by (e.g., Tuple 14 has been processed by Operators A, B, and C) The collected information may be recorded in a streaming log maintained for the stream computing environment. Other methods of detecting the set of tuples are also possible.

In embodiments, aspects of the disclosure relate to detecting the set of tuples within the consistent region of the stream computing environment. Generally, the consistent region can include a subgraph (e.g, area, portion) of a stream computing environment configured to reduce data loss as a result of software errors events and hardware failure. In embodiments, aspects of the consistent region relate to processing each tuple within the subgraph at least once, such that tuples that exit the consistent region may be associated with new operating behavior (e.g., as established by one or more operators of the consistent region). In embodiments, the consistent region may be drained of current tuples, such that the tuples within the consistent region are processed through to the end of the subgraph. In-memory states of the operators may be serialized and stored at checkpoints for each of the operators in the region. In embodiments, aspects of the disclosure relate to a consistent region configured to utilize tuple reprocessing (e.g., replay), dynamic reconfiguration (e.g., live switchover), and other techniques to facilitate processing of the set of tuples. Other methods of using the consistent region are also possible.

At block 650, a tuple adjustment action may be determined. The tuple adjustment action may be determined for the set of tuples of the stream of tuples in the consistent region based on the operator modification request. Generally, determining can include identifying, selecting, computing, or ascertaining the tuple adjustment action. In embodiments, determining may include analyzing the operator modification request and ascertaining one or more tuple adjustment actions which may be associated with positive impacts with respect to processing of the set of tuples. The tuple adjustment action may include a task, job, operation, activity, or other process configured to modify, alter, revise, repair, or otherwise change one or more tuples (e.g., to facilitate tuple processing). As examples, the tuple adjustment action may include reprocessing the set of tuples (e.g., by updated operators), generating a queue for the set of tuples (e.g., holding the tuples until after an update completes), dynamically reconfiguring the set of tuples, repealing an update to the set of tuples (e.g., rolling back the tuples to a previous version), or the like. Other methods of determining the tuple adjustment action are also possible.

In embodiments, the tuple adjustment action may be determined using the operator modification request. In embodiments, the operator modification request may designate, specify, or otherwise indicate one or more recommended tuple adjustment actions based on the type and nature of the change to the set of stream operators. For instance, in the event that the operator modification request indicates a code update to a large number of operators, a tuple adjustment action including holding the tuples until conclusion of the update may be suggested (e.g., in cases where many operators are updated, holding tuples until update conclusion may be desirable). In certain embodiments, determining the tuple adjustment action may include analyzing the operator modification request to identify characteristics regarding the nature of the change to the set of stream operators, and consulting a tuple adjustment database to ascertain the tuple adjustment action. For example, an operator modification request may be analyzed, and it may be identified that the operator modification request may relate to updating a relatively small number of operators, and that only a small number of tuples in the consistent region will be affected by the update. Accordingly, these characteristics of the operator modification request may be used in conjunction with the tuple adjustment database to identify one or more appropriate tuple adjustment actions. Other methods of determining the tuple adjustment action are also possible.

In embodiments, the tuple adjustment action may include reprocessing (e.g., replaying) a set of downstream tuples at block 652. The set of downstream tuples may be reprocessed in response to updating the set of operating code of the subset of the set of stream operators. Generally, reprocessing can include performing one or more operations, actions, or processes with respect to the set of tuples (e.g., by one or more updated stream operators). In embodiments, reprocessing the set of downstream tuples may include identifying a set of tuples that are located downstream (e.g., further ahead in the data flow path through the consistent region) with respect to a farthest-upstream stream operator of the subset of the set of stream operators, and capturing the tuples for rerouting through one or more stream operators (e.g., upstream operators) of the consistent region. The set of downstream tuples can include tuples that are currently in process by the farthest-upstream stream operator as well as those tuples that are located further down the data-flow path of the consistent region. In certain embodiments, tuples that have exited the consistent region may also be captured and reprocessed. Aspects of the disclosure, in embodiments, relate to reprocessing the set of downstream tuples using one or more stream operators of the consistent region that have been updated since initial processing of the set of downstream tuples. As an example, a first set of tuples may be processed by a first stream operator of a consistent region before progressing further down the data flow path. In response to the set of operating code of the first stream operating being updated, the first set of tuples may be identified and captured to be rerouted and reprocessed through the first stream operator. Other methods of reprocessing the set of downstream tuples are also possible.

At block 670, the set of stream operators may be modified. The set of stream operators may be modified based on the operator modification request. Generally, modifying the set of stream operators can include adjusting, altering, repairing, revising, or otherwise changing one or more properties or attributes of the set of stream operators. As described herein, modifying the set of stream operators may be based on the operator modification request. For instance, the operator modification request may designate, indicate, or specify the set of stream operators to be modified as well as how they should be altered. In embodiments, modifying the set of stream operators can include adding one or more stream operators, removing one or more stream operators, altering the flow of tuples through the consistent region, or configuring one or more parameters of the stream operators. For instance, in certain embodiments, a particular operator (e.g., format operator) may be removed from the consistent region and replaced with two new operators (e.g., parse operator and sort operator). As another example, one or more stream operators may be disabled, and the flow of tuples may be routed through another path of stream operators in the consistent region. Other methods of modifying the set of stream operators are also possible.

In embodiments, the consistent region may be hot-fixed using a data capture-and-replay operation at 672. Generally, hot-fixing the consistent region can include a code update, corrective action, or software patch that is dynamically applied to the consistent region. In embodiments, the hot-fix may be applied with respect to the run-time or execution phase (e.g., during operation) of a stream computing application running in the stream computing environment. As described herein, the hot-fix for the consistent region may include a data capture-and-replay operation. In embodiments, the data capture-and-replay operation may include identifying a set of tuples (e.g., downstream tuples) and routing the set of tuples to one or more upstream stream operators for reprocessing. Consider the following example. During runtime of a stream computing application, a code update may be initialized with respect to a stream operator A and a stream operator C of the consistent region. In response to the code update, a hot-fix may be dynamically introduced to the consistent region to determine a set of tuples that were processed by one or more of stream operators A or C, and replay (e.g., reprocess) the set of tuples through stream operators A and C. Other methods of hot-fixing the consistent region are also possible.

At block 690, the set of tuples may be processed. The set of tuples may be processed using the tuple adjustment action or the modified set of stream operators. Generally, processing the set of tuples can include analyzing, evaluating, examining, modifying, or otherwise performing an operation on the set of tuples. In embodiments, processing can include performing one or more aspects of the tuple adjustment action (e.g., determined at block 650) with respect to the set of tuples. For instance, processing the set of tuples may include replaying the set of tuples through updated operators, holding the tuples (e.g., until update completion), or tagging the tuples (e.g., in association with a live switchover operation). In embodiments, processing may include performing an operation on the set of tuples using one or more stream operators of the consistent region. As examples, processing the set of tuples may include sorting, categorizing, filtering, ordering, parsing, splitting, joining, compressing, decompressing, delaying, formatting, importing, exporting, or performing other operation(s) on the set of tuples. Other methods of processing the set of tuples are also possible.

In embodiments, each individual tuple of the set of tuples may be processed at block 692. Aspects of the disclosure relate to processing each individual tuple of the set of tuples such that the tuples that exit the consistent region follow updated stream operator behavior. In embodiments, processing each individual tuple of the set of tuples may include resolving the operator modification request for each tuple. Resolving the operator modification request may include identifying a tuple adjustment action (e.g., reprocessing, queuing) based on the operator modification request, and performing the tuple adjustment action with respect to one or more tuples. The tuple adjustment action resolved for each tuple may vary based on the type, source/destination, order, and other attributes for the tuple. For instance, a first tuple that is associated with a time-sensitive arrival parameter may be identified for reprocessing, while a second tuple associated with an order-sensitive arrival parameter may be identified for queuing (e.g, reprocessing may be associated with faster arrival time, while queuing may be associated with order preservation). Accordingly, each tuple that exits the consistent region may be adjusted to correspond to the behavior of the updated stream operators. Other methods of processing each tuple in the consistent region are also possible.

In embodiments, updates to the set of operating code of the subset of the set of stream operators may be repealed at block 694. Repealing the updates to the set of operating code may be performed in response to detecting a triggering event. Generally, repealing can include cancelling, restoring, rescinding, revising, rolling-back, or otherwise returning the set of operating code of the subset of stream operators to a previous state. Aspects of the disclosure relate to the recognition that, in some situations, it may be desirable to remove one or more operating code updates to restore a subset of stream operators to a prior configuration. In embodiments, repealing the updates to the set of operating code may be performed in response to detecting a triggering event. The triggering event can include a detection of an error event with respect to one or more stream operators, corrupted or damaged tuples above a threshold value, computing resource insufficiency, load balancing, or the like. Accordingly, in embodiments, repealing the updates to the set of operating code of the subset of stream operators may be associated with restoring a more stable, consistent, or operational configuration for the stream computing application.

Consider the following example. An error event may be detected with respect to a first streaming operator. The error event may relate to an incompatibility between a new firmware version of the first streaming operator and an operating system of the stream computing environment, such that tuples are processed by the first streaming operator at a speed slower than expected. Accordingly, as described herein, the firmware version of the first streaming operator may be rolled-back to a previous version (e.g., that was associated with stable tuple processing). Other methods of repealing updates to the set of operating code of the subset of stream operators are also possible.

In embodiments, a set of downstream tuples may be determined to be reprocessed at block 696. The set of downstream tuples may be determined to be reprocessed in response to repealing updates to the set of operating code of the subset of the set of stream operators. Generally, determining can include identifying, selecting, or ascertaining to reprocess the set of downstream tuples. The set of downstream tuples can include tuples that are located downstream (e.g., further ahead in the data flow path through the consistent region) with respect to a farthest-upstream stream operator of the subset of the set of stream operators. In embodiments, the set of downstream tuples may include tuples that have exited the consistent region. As described herein, aspects of the disclosure relate to processing the set of tuples to facilitate consistent streaming behavior. Accordingly, in response to repealing updates to the set of stream operators of the consistent region, it may be determined to reprocess the set of tuples to establish streaming behavior for the set of tuples that is in accordance with the set of stream operators. Other methods of determining to reprocess the set of downstream tuples are also possible.

The set of downstream tuples may be reprocessed in response to updating the set of operating code of the subset of the set of stream operators. Generally, reprocessing can include performing one or more operations, actions, or processes with respect to the set of tuples (e.g., by one or more updated stream operators). In embodiments, reprocessing the set of downstream tuples may include identifying a set of tuples that are located downstream (e.g., further ahead in the data flow path through the consistent region) with respect to a farthest-upstream stream operator of the subset of the set of stream operators, and capturing the tuples for rerouting through one or more stream operators of the consistent region. The set of downstream tuples can include tuples that are currently in process by the farthest-upstream stream operator as well as those tuples that are located further down the data-flow path of the consistent region. Aspects of the disclosure, in embodiments, relate to reprocessing the set of downstream tuples using one or more stream operators of the consistent region that have been updated since initial processing of the set of downstream tuples. As an example, a first set of tuples may be processed by a first stream operator of a consistent region before progressing further down the data flow path. In response to the set of operating code of the first stream operating being updated, the first set of tuples may be identified and captured to be rerouted and reprocessed through the first stream operator. Other methods of reprocessing the set of downstream tuples are also possible.

Method 600 concludes at block 699. Aspects of method 600 may provide performance or efficiency benefits for managing a stream computing environment. For example, aspects of method 600 may have positive impacts with respect to facilitating consistent stream operator behavior. The receiving, detecting, determining, modifying, and processing described herein may each occur in an automated fashion without user invention. Altogether, processing a set of tuples in a consistent region using a tuple adjustment action may be associated with performance or efficiency benefits for stream computing environment management (e.g., stability, speed, computing resource efficiency).

Figure 7:
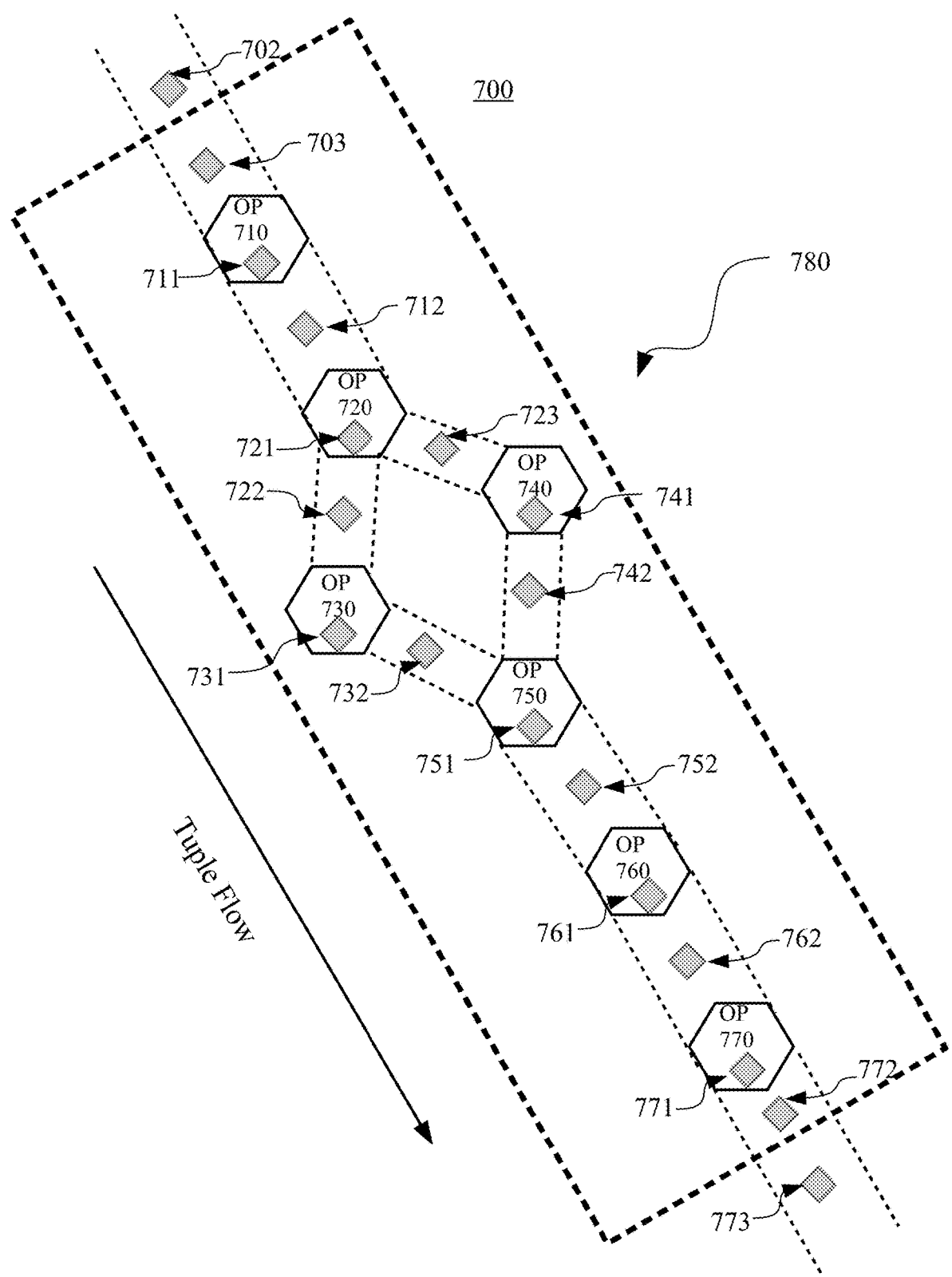
FIG. 7 illustrates an example stream computing environment with respect to managing a set of tuples in a consistent region, according to embodiments.

FIG. 7 illustrates an example stream computing environment 700 with respect to managing a set of tuples in a consistent region, according to embodiments. Aspects of the example stream computing environment 700 relate to processing a set of tuples by a set of stream operators within a consistent region of the steam computing environment. The stream computing environment 700 can include a consistent region 780, stream operators 710, 720, 730, 740, 750, 760, 770, tuples 702, 703, 711, 712, 721, 722, 723, 731, 732, 741, 742, 751, 752, 761, 762, 771, 772, and 773. Aspects of the stream computing environment 700 relate to determining and performing a tuple adjustment action for a set of tuples. Aspects of the stream computing environment 700 may be associated with benefits including stream computing stability and computing resource efficiency.

In embodiments, determining the tuple adjustment action for the set of tuples may include identifying a subset of the set of tuples. The subset of the set of tuples may include one or more tuples which were processed by the subset of the set of stream operators prior to updating the set of operating code of the subset of stream operators. Generally, identifying can include recognizing, discovering, selecting, ascertaining, or otherwise determining the subset of the set of tuples. In embodiment, identifying the subset of the set of tuples may include analyzing the tuples within the consistent region, and determining which tuples were processed by the subset of stream operators prior to updating the set of operating code based on one or more attributes of the tuples. For example, the subset of the set of tuples may be associated with time stamps or other identifiers that indicate when they were processed and which stream operators they were processed by. Accordingly, identifying the subset of the set of tuples may include comparing the time stamp for each tuple in the consistent region with an update log for the set of stream operators to select the tuples that were processed by the stream operators prior to the stream operator code update. Other methods of identifying the subset of the set of tuples are also possible.

In embodiments, it may be determined to perform a reprocessing action. The reprocessing action may include processing the subset of the set of tuples using the subset of the set of stream operators in response to updating the set of operating code of the subset of the set of stream operators. Generally, determining can include identifying, selecting, computing, or ascertaining to perform the reprocessing action. As described herein, aspects of the disclosure relate to processing the set of tuples by the updated subset of stream operators in order to establish consistent, up-to-date behavior for the set of tuples. In embodiments, determining to perform the reprocessing action may include inspecting the subset of the set of stream operators to verify that the code update for each stream operator has completed, and that the set of stream operators are initialized and configured for reprocessing the subset of the set of tuples. Other methods of determining to perform the reprocessing action are also possible.

Consider the following example. Tuples 762, 771, 772, and 773 may pass into the consistent region 780 and be processed by a plurality of stream operators including stream operator 760 and stream operator 770 before arriving at the locations illustrated in FIG. 7. In embodiments, subsequent to processing of tuples 762, 771, 772, and 773, a code update may be initiated for stream operators 760 and 770. Accordingly, as tuples 762, 771, 772, and 773 were processed prior to the code update for stream operators 760 and 770, a subset of the tuples may be identified (e.g., for reprocessing). In embodiments, only the tuples remaining in the consistent region at the time of update completion may be identified (e.g., tuples 762, 771, 772). In certain embodiments, tuples that have exited the consistent region may also be identified (e.g., tuples 762, 771, 772, and 773). After identification of the subset of tuples, it may be determined to perform a reprocessing action with respect to the subset of the set of tuples. Determining to perform the reprocessing action may include verifying that the updated stream operators 760 and 770 are prepared for receiving and processing of the subset of the set of tuples. Accordingly, in embodiments, tuples 762, 771, and 772 may be captured and rerouted for reprocessing by stream operators 760 and 770. Other methods of identifying and determining to reprocess the subset of the set of tuples are also possible.

In embodiments, determining the tuple adjustment action for the set of tuples may include identifying an unaffected segment of the set of tuples. The unaffected segment of the set of tuples may be without an indication of processing by the subset of the set of stream operators. Generally, identifying the unaffected segment of the set of tuples can include recognizing, discovering, selecting, ascertaining, or otherwise determining a segment of the set of tuples that are not influenced, impacted, altered, modified, or otherwise changed by the code update. For instance, the unaffected segment of the set of tuples may not have been processed by the subset of the set of stream operators (e.g., tuples that flowed down a separate path or branch than the path including the updated stream operators). As another example, the unaffected segment of the set of tuples may include tuples that do not include properties, attributes, or other characteristics that relate to the operations performed by the subset of stream operators, or tuples that are already in a particular configuration prior to processing (e.g., tuples that are already in a correct order prior to processing by an ordering operator). Other methods of identifying the unaffected segment of the set of tuples are also possible.

In embodiments, it may be determined to disregard updates to the set of operating code of the subset of the set of stream operators for the unaffected segment of the set of tuples. Generally, disregarding can include ignoring, disabling, removing, or omitting portions of the operating code update with respect to the unaffected segment of the set of tuples. In embodiments, disregarding the updates for the unaffected segment of the set of tuples may include comparing the properties or attributes of a first tuple with the operating code of the subset of the set of stream operators, and ascertaining one or more portions of the operating code that do not apply to the first tuple. Accordingly, the first tuple may be processed by the subset of the stream operators without the ascertained portions of the operating code being applied to the first tuple. In embodiments, disregarding updates with respect to the unaffected segment of the set of tuples can include determining not to reprocess (e.g., replay) the unaffected segment of the set of tuples. Disregarding updates with respect to the unaffected segment of the set of tuples may be associated with processing speed and efficiency. Other methods of disregarding updates to the set of operating code of the set of stream operators for the unaffected segment of the set of tuples are also possible.

Consider the following example. In embodiments, a firmware update may be initiated for stream operator 740. As described herein, the set of tuples in the consistent region may be analyzed to identify an unaffected segment of the set of tuples. For instance, in embodiments, as tuples 722, 731, and 732 flowed down a separate branch of the data flow path than that containing the updated stream operator 740 (e.g., were not processed by stream operator 740), they may be identified as belonging to the unaffected segment of the set of tuples. In embodiments, in response to analyzing the set of tuples with respect to the set of stream operators, it may be determined that tuple 742 also belongs to the unaffected segment (e.g., although it was processed by the updated operator 740, it was unaffected by the firmware update to the operator). Accordingly, in response to determining the unaffected segment of the set of tuples, it may be determined to disregard updates with respect to tuples 722, 731, 732, and 742. As an example, tuples 722, 731, 732, and 742 may be exempted or omitted from a reprocessing action performed with respect to the set of tuples. Other methods of managing identification of the unaffected segment of the set of tuples and disregarding updates with respect to the unaffected segment are also possible.

In embodiments, aspects of the disclosure relate to the recognition that the exit-order (e.g., order or sequence with which the tuples exit the consistent region) of the set of tuples may not be relevant to the operation of a streaming application running on the stream computing environment. Accordingly, in embodiments, it may be determined to disregard an exit-order of the set of tuples from the consistent region. Generally, disregarding can include ignoring or discounting the sequence of the tuples that exit the consistent region. In embodiments, disregarding the exit-order of the set of tuples may be based on a user-input. For example, an administrator of the streaming application may input a command to the stream computing environment to indicate that the exit-order of the set of tuples may be disregarded. In embodiments, the exit-order of the tuples may be disregarded based on the nature of the tuples. For instance, the set of tuples may be analyzed, and a tag or other identifier that indicates that the exit-order is not relevant may be identified. In embodiments, disregarding the exit order of the set of tuples may be based on a stream priority factor. The stream priority factor may represent the relative importance or significance of one or more aspects of managing the stream computing environment. For example, in certain situations, the stream priority factor may indicate that the speed of processing the tuples is more important than the exit-order of the set of tuples. Accordingly, the exit-order of the set of tuples may then be disregarded in order to prioritize tuple processing speed. Other methods of disregarding the exit-order of the set of tuples are also possible.

In embodiments, a subset of the set of tuples may be identified. The subset of the set of tuples may include one or more tuples which were processed by the subset of the set of stream operators prior to updating the set of operating code of the subset of stream operators. In embodiment, identifying the subset of the set of tuples may include analyzing the tuples within the consistent region, and determining which tuples were processed by the subset of stream operators prior to updating the set of operating code based on one or more attributes of the tuples (e.g., comparing a time stamp of the tuples to an update log for the set of stream operators). In embodiments, it may be determined to perform a reprocessing action with respect to the identified subset of the set of tuples. The set of tuples may be reprocessed by an updated subset of stream operators in order to establish consistent, up-to-date behavior for the set of tuples before exiting the consistent region. Other methods of identifying the subset of the set of tuples and determining to perform the reprocessing action are also possible.

In embodiments, an unaffected segment of the set of tuples may be identified. The unaffected segment of the set of tuples may be without an indication of processing by the subset of the set of stream operators. The unaffected segment of the set of tuples may include one or more tuples that were not influenced, impacted, altered, modified, or otherwise changed by the code update (e.g., not processed by a subsequently updated stream operator, not related to the code update for the stream operator). In embodiments, it may be determined to disregard updates to the set of operating code of the subset of the set of stream operators for the unaffected segment of the set of tuples. Disregarding the updates for the unaffected segment of the set of tuples may include ascertaining one or more portions of the operating code that do not apply to the first tuple, and determining not to reprocess (e.g., replay) the unaffected segment of the set of tuples through the subset of stream operators. Other methods of identifying an unaffected segment of tuples and disregarding updates with respect to the unaffected segment are also possible.

Consider the following example. A software patch may be performed with respect to stream operators 730 and 760. In embodiments, a stream priority factor may indicate that the exit-order of the set of tuples in the consistent region 780 may be disregarded (e.g., in favor of prioritizing processing speed). The set of tuples within the consistent region may be examined, and both a subset of the set of tuples that were processed prior to updating of stream operators 730 and 760, as well as a segment of tuples that were unaffected by the update to stream operators 730 and 760 may be identified. For instance, in embodiments, tuples 731, 732, 752, 761, and 772 may be identified as tuples that were processed by one or more of operators 730 or 760. In embodiments, tuples 741, 742, 751, 762, and 770 may be identified as tuples that were unaffected by the update to stream operators 730 and 760. Accordingly, as tuples 731, 732, 752, 761, and 772 were processed prior to the code update to operators 730 and 760, they may be determined to be reprocessed, and routed to stream operator 730 for replay through to the exit of the consistent region. As tuples 741, 742, 751, 762, and 770 were identified as belonging to the segment of tuples unaffected by the code update to stream operators 730 and 760, they may be omitted from the reprocessing action, and the code updates may be disregarded. Other methods of managing tuples for which exit-order may be disregarded are also possible.

In embodiments, aspects of the disclosure relate to the recognition that the exit-order (e.g., order or sequence with which the tuples exit the consistent region) of the set of tuples may be relevant to the operation of a streaming application running on the stream computing environment. Accordingly, in embodiments, it may be determined to maintain an exit-order of the set of tuples from the consistent region. Determining to maintain the exit-order of the set of tuples may be based on a user-input (e.g., command from an administrator), system configuration parameter (e.g., setting for the stream application), nature of the tuples (e.g., properties or attributes; order tag), or stream priority factor (e.g., order/sequence is more important relative to other factors). Generally, maintaining the exit-order of the set of tuples can include preserving, sorting, ordering, reordering, or otherwise managing the order of the set of tuples such that the exit-order substantially corresponds to a desired order of sequence. In embodiments, the order of the tuples may be maintained such that the exit-order substantially corresponds to the order in which the tuples enter the consistent region. In embodiments, maintaining the exit-order of the set of tuples can include examining the set of tuples to identify an order tag associated with each tuple that indicates a desired exit-order. For instance, a particular tuple may be associated with an order tag that indicates that it should be the fourth tuple to exit the consistent region. Based on the order tags, the set of tuples may be sorted or ordered to correspond to the indicated exit-order. In embodiments, the set of tuples may be ordered using a sort operator. Other methods of maintaining the exit-order of the set of tuples are also possible.

In embodiments, it may be determined to reprocess a set of downstream tuples in response to updating the set of operating code of the subset of the set of stream operators. As described herein, reprocessing the set of downstream tuples may include identifying a set of tuples that are located downstream (e.g., further ahead in the data flow path through the consistent region) with respect to a farthest-upstream stream operator of the subset of the set of stream operators, and capturing the tuples for rerouting through one or more stream operators of the consistent region. The set of downstream tuples can include tuples that are currently in process by the farthest-upstream stream operator as well as those tuples that are located further down the data-flow path of the consistent region. In embodiments, the set of tuples may be reprocessed using one or more stream operators of the consistent region that have been updated since initial processing of the set of downstream tuples. Other methods of reprocessing the set of tuples are also possible.

Consider the following example. A code update may be performed with respect to stream operators 720 and 770. In embodiments, an input may be received from an administrator of the stream computing environment that indicates that the exit-order of the set of tuples in the consistent region 780 should be maintained. The set of tuples within the consistent region may be examined, and a subset of the set of tuples that are located downstream with respect to stream operator 720 (e.g., the farthest upstream stream operator of the updated stream operators) may be identified. For example, in embodiments, tuples 721, 722, 723, 731, 732, 741, 742, 751, 752, 761, 762, 771, and 772 may be identified as tuples that were processed by one or more of stream operators 720 or 770. The identified set of downstream tuples may then be determined to be reprocessed by the updated stream operators. Accordingly, the set of downstream tuples may be captured and routed to operator 720 to be reprocessed, and flow through the data flow path to exit the consistent region 780. In embodiments, in response to reprocessing, the subset of the set of tuples may be reordered. For example, a sort operator may be located at the end of the consistent region 780, and be configured to order the tuples based on their respective ordering tags. Other methods of managing exit-order for tuples are also possible.

In embodiments, the tuple adjustment action may include queuing a set of upstream tuples. The set of upstream tuples may be queued in response to receiving the operator modification request. Generally, queuing can include arranging, ordering, sequencing, holding, detaining, or otherwise organizing the set of upstream tuples. In embodiments, queuing the set of upstream tuples may include identifying tuples that are located upstream (e.g., earlier in the data flow path through the consistent region) with respect to a farthest-upstream stream operator of the subset of the set of stream operators (e.g., the farthest-upstream stream operator among the updated operators), and placing them in a hold queue for later processing. In embodiments, aspects of the disclosure relate to queuing a set of upstream tuples until completion of a code update to one or more stream operators. In certain embodiments, the set of upstream tuples may remain in the hold queue until completion of a reprocessing action with respect to other tuples of the consistent region. Other methods of queuing the set of upstream tuples are also possible.

Consider the following example. A software update may be initiated for operator 720. In response to initiation of the software update, one or more upstream tuples may be identified for queuing. In embodiments, tuples 703, 711, and 712 may be identified for queuing (e.g., they are located upstream with respect to stream operator 720). In certain embodiments, tuples that have not yet entered the consistent region 780 (e.g., tuple 702) may also be identified for queuing. Tuples 703, 711, and 712 may be placed in a hold queue until the software update for operator 720 has completed, and operator 720 becomes available to receive and process tuples. As described herein, in certain embodiments, tuples 703, 711, and 712 may remain in the hold queue until a set of downstream tuples (e.g., tuples that were processed by operator 720 prior to the software update) have been reprocessed Other methods of queuing the set of upstream tuples are also possible.

In embodiments determining the tuple adjustment action for the set of tuples may include performing a switchover action. The switchover action may include a dynamic reconfiguration (e.g., replacement) of one or more stream operators to reduce or prevent data loss. In embodiments, a subset of the set of tuples may be identified. The subset of the set of tuples may include tuples which were processed by the subset of the set of stream operators prior to updating the set of operating code of the subset of the set of stream operators. As described herein, identifying the subset of the set of tuples can include analyzing the tuples within the consistent region, and determining which tuples were processed by the subset of stream operators prior to updating the set of operating code based on one or more attributes of the tuples (e.g., comparing a time stamp of the tuples to an update log for the set of stream operators). Other methods of identifying the subset of the set of tuples are also possible.

In embodiments, it may be determined to perform a switchover action. The switchover action may be performed with respect to the subset of tuples (e.g., those tuples identified as having been processed by the subset of the set of stream operators prior to updating the set of operating code of the subset of the set of stream operators). In embodiments, performing the switchover action may include marking the subset of the set of tuples to indicate processing by the subset of the set of stream operators prior to the operating code update. Marking may include tagging, flagging, highlighting, annotating, or otherwise distinguishing the subset of the set of tuples. For instance, marking may include attaching a color-coded identifier to each tuple of the subset to indicate which stream operators it has been processed by. The identifiers may also include information regarding the time the tuple was processed by each operator, the operations performed on the tuple by the operator, and other information. In embodiments, performing the live switchover action may include manually modifying (e.g., changing a parameter or setting, performing an operation, replacing with other tuples) the marked subset of tuples to facilitate consistent behavior of the tuples exiting the consistent region. In embodiments, performing the live switchover may include replacing an updated stream operator with a new stream operator. Other methods of performing the live switchover are also possible.

Consider the following example. A code update may be initiated for stream operator 730. In response to initiation of the code update, a subset of tuples that were processed by stream operator 730 prior to the code update may be identified. In embodiments, tuples 731, 732 and 761 may be identified as tuples that were processed by stream operator 730 prior to the code update. Accordingly, aspects of the disclosure relate to performing a live switchover with respect to tuples 731, 732 and 761. For instance, tuples 731, 732 and 761 may be marked with identifiers that indicate that they were processed by stream operator 730, and the times at which they were each processed. In embodiments, subsequent to processing and marking of the subset of tuples, operator 730 may be dynamically replaced with a new stream operator. In embodiments, the marked tuples 731, 732 and 761 may be modified to align with the operating behavior of the new stream operator. Other methods of performing live switchover are also possible.

Figure 8:
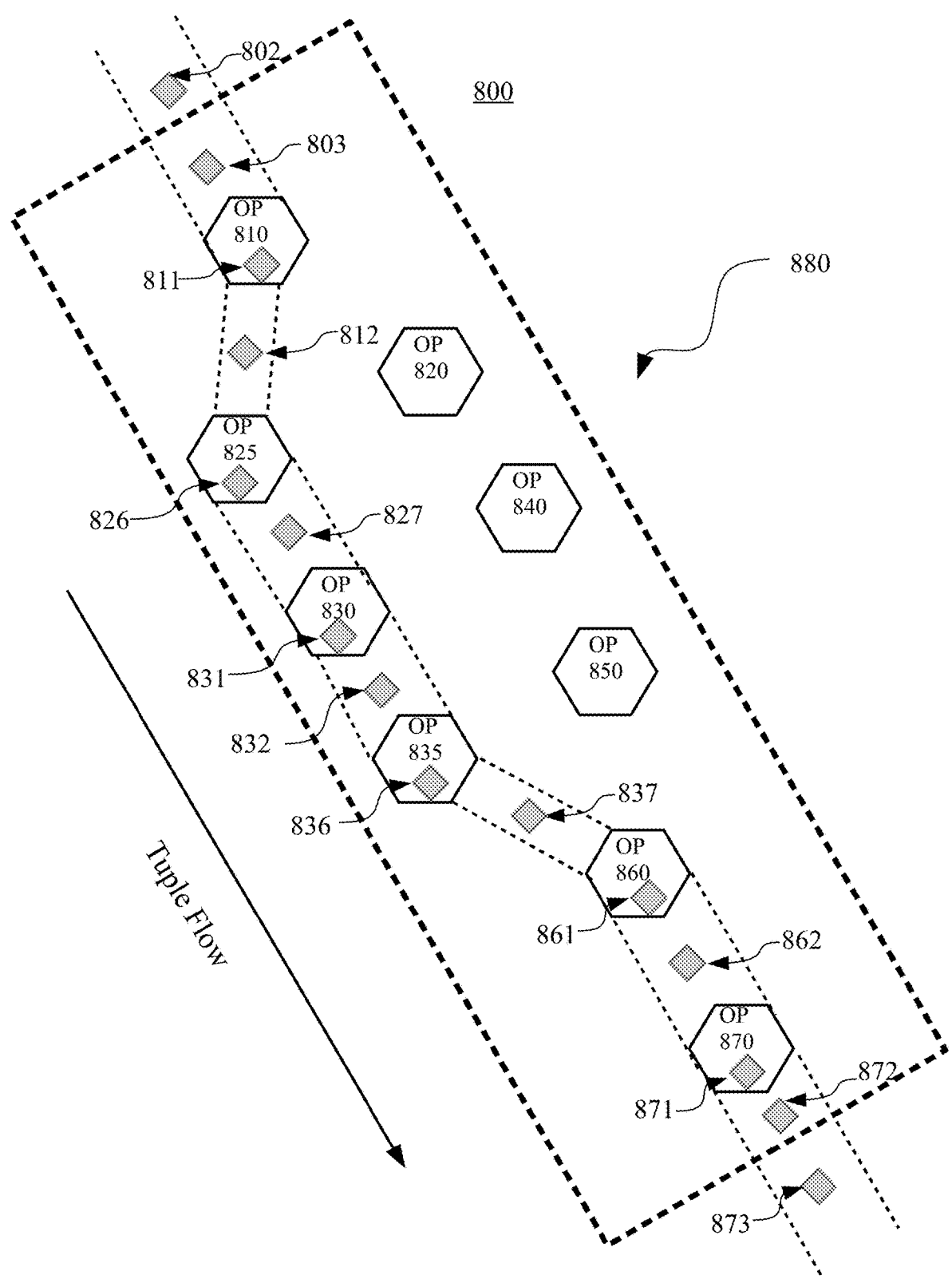
FIG. 8 illustrates an example stream computing environment with respect to managing a set of tuples in a consistent region, according to embodiments.

FIG. 8 illustrates an example stream computing environment 800 with respect to managing a set of tuples in a consistent region, according to embodiments. Aspects of the example stream computing environment 800 relate to receiving and performing an operator modification request. The stream computing environment 800 can include a consistent region 880, stream operators 810, 820, 825, 830, 835, 840, 850, 860, 870, tuples 802, 803, 811, 812, 826, 827, 831, 832, 836, 837, 861, 862, 871, 872, and 873. Aspects of the stream computing environment 800 relate to generating a new group of stream operators, and switching processing from the subset of the set of stream operators to the new group of stream operators. Aspects of the stream computing environment 800 may be associated with benefits including stream computing stability and computing resource efficiency.

In embodiments, a new group of stream operators may be generated. The new group of stream operators may correspond to a subset of the set of stream operators. Generally, generating can include introducing, creating, adding, or otherwise establishing the new group of stream operators. Generating the new group of stream operators can include introducing one or more stream operators to the consistent region 880 of the stream computing environment in order to facilitate processing of the set of tuples. For instance, one or more stream operators of the new group of stream operators may be associated with faster tuple processing rates, additional functionality, operational flexibility, processing reliability, or other feature or property to facilitate tuple processing. In embodiments, the new group of stream operators may correspond to a the subset of the set of stream of stream operators. For instance, the new stream operators may be configured to perform substantially similar operations with respect to the set of tuples, be placed in corresponding locations in the consistent region, or be used for similar purposes as the subset of the set of stream operators. Generating the new group of stream operators may be associated with benefits including tuple processing speed, reliability, or other positive performance impacts. Other methods of generating the new group of stream operators are also possible.

In embodiments, processing may be switched from the subset of the set of stream operators to the new group of stream operators. Switching processing from the subset of the set of stream operators to the new group of stream operators may be performed in a dynamic fashion in response to the generation of the new group of stream operators. Generally, switching can include shifting, replacing, diverting, exchanging, or otherwise transferring processing of the set of tuples from the subset of the set of stream operators to the new group of stream operators. In embodiments, switching may include rerouting or altering the flow of the stream of tuples from the subset of the set of stream operators to the new group of stream operators. In certain embodiments, switching may include assigning one or more tuples of the set of tuples for processing by one or more stream operators of the new group of stream operators, and configuring the new group of stream operators to perform one or more desired operations on the set of tuples. As described herein, in embodiments, generation of a new group of stream operators and dynamic switching of processing to the new group of stream operators may be one method of live switchover. In certain embodiments, updates to the set of operating code of the subset of the set of stream operators may be repealed in relation to the generation of the new group of stream operators and dynamic switching of processing to the new group of stream operators. Accordingly, as described herein, repealing the updates to the set of operating code may be performed in response to detecting a triggering event. Other methods of switching processing from the subset of the set of stream operators to the new group of stream operators are also possible.

Consider the following example. A new group of stream operators including stream operator 825 and operator 835 may be generated and added to the consistent region 880 of stream computing environment 800. In embodiments, generation and placement of the new group of stream operators may be performed in response to a code update to one or more other operators (e.g., stream operators 820, 840, 850) of the consistent region 880. In response to generation and placement of the new group of stream operators, processing of the set of tuples may be switched from the subset of the set of stream operators to the new group of stream operators. As shown in FIG. 8, the data flow path for the set of tuples may be altered to bypass stream operators 820, 840, and 850, and instead be routed to stream operators 825, 830, and 835 before. Accordingly, tuples including tuples 803, 812, 826, 827, 831, 832, 836, and 837 may be processed by the new group of consistent operators as they pass through the consistent region 880. Other methods of generating a new group of stream operators and switching processing to the new group of stream operators are also possible.

Figure 9:
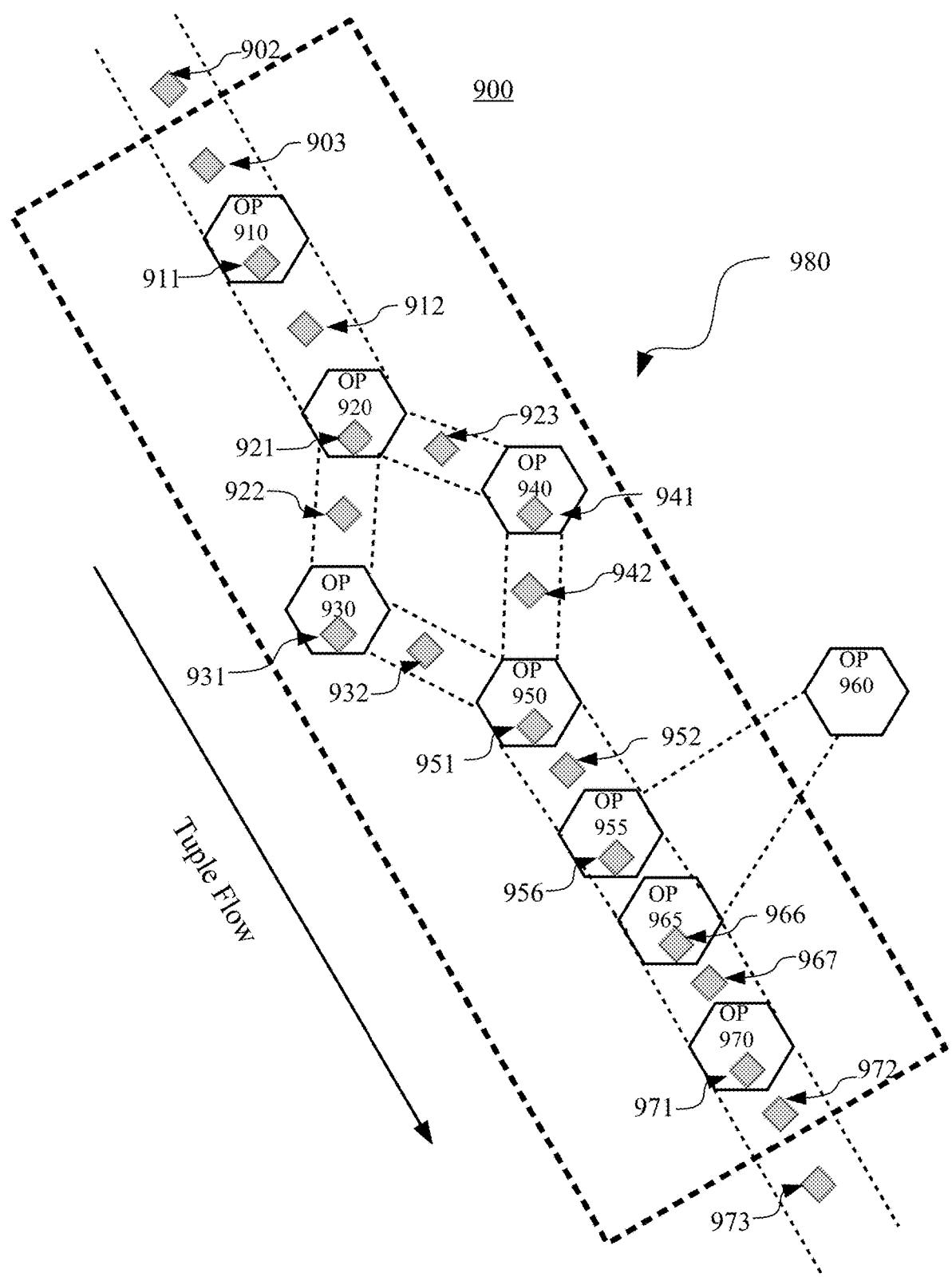
FIG. 9 illustrates an example stream computing environment with respect to managing a set of tuples in a consistent region, according to embodiments.

FIG. 9 illustrates an example stream computing environment 900 with respect to managing a set of tuples in a consistent region, according to embodiments. Aspects of the example stream computing environment 900 relate to receiving and performing an operator modification request. The stream computing environment 900 can include a consistent region 980, stream operators 910, 920, 930, 940, 950, 955, 960, 965, 970, tuples 902, 903, 911, 912, 921, 922, 923, 931, 932, 941, 942, 951, 952, 956, 966, 967, 971, 972, and 973. Aspects of the stream computing environment 900 relate to a change to the set of stream operators which alters a count of the set of stream operators of the consistent region of the stream computing environment. Aspects of the stream computing environment 900 may be associated with benefits including stream computing stability and computing resource efficiency.

In embodiments, the operator modification request may include a change to the set of stream operators which alters a count of the set of stream operators of the consistent region of the stream computing environment. Generally, the change may include an addition, removal, replacement, or other modification that increases or decreases the number of stream operators of the consistent region of the computing environment. In embodiments, the change to the number of stream operators may be performed in response to a user input (e.g., command from an administrator). In embodiments, the change to the number of stream operators may be performed in response to a triggering event (e.g., tuple processing bottleneck, computing resource insufficiency) without intervention from a user. In certain embodiments, two or more stream operators may be replaced by a lesser number of stream operators. For example, in embodiments, two stream operators may be replaced by one operator by fusing the two operators together. In embodiments, one stream operator may be replaced by two or more new stream operators. For instance, a particular stream operator may be replaced by two new stream operators in order to perform different operations on the set of tuples. As an example, as shown in FIG. 9, stream operator 960 (e.g., a gate operator) may be replaced by stream operator 955 (e.g., a format operator) and stream operator 965 (e.g., a file sink operator). In certain embodiments, updates to the set of operating code of the subset of the set of stream operators may be repealed in relation to the change to the set of stream operators which alters a count of the set of stream operators of the consistent region of the stream computing environment. Accordingly, as described herein, repealing the updates to the set of operating code may be performed in response to detecting a triggering event. Other methods of altering the count of the set of stream operators of the consistent region of the stream computing environment are also possible.

FIG. 10 is a flowchart illustrating a method 1000 for managing a set of tuples in a consistent region, according to embodiments. Aspects of the method 1000 may relate to receiving and processing a stream of tuples. The method 1000 may begin at block 1001. At block 1010, an operator modification request may be detected. At block 1030, a set of tuples may be detected. At block 1050, a tuple adjustment action may be determined. At block 1070, a set of stream operators may be modified. At block 1090, the set of tuples may be processed. Aspects of the method 1000 may substantially correspond to other embodiments described herein, including FIGS. 1-10.

At block 1092, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-10. Current/future processing by the plurality of processing elements may be performed consistent with the description herein including FIGS. 1-10. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1094. The stream of tuples may be processed by the plurality of processing elements operating on the set of compute nodes. The stream of tuples may be processed consistent with the description herein including FIGS. 1-10. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 1000 concludes at block 1099. Aspects of method 1000 may provide performance or efficiency benefits for managing a stream computing environment. For example, aspects of method 1000 may have positive impacts with respect to facilitating consistent stream operator behavior. The receiving, detecting, determining, modifying, and processing described herein may each occur in an automated fashion without user invention. Altogether, processing a set of tuples in a consistent region using a tuple adjustment action may be associated with performance or efficiency benefits for stream computing environment management (e.g., stability, speed, computing resource efficiency).

In embodiments, the receiving, the detecting, the determining, the modifying, and the processing steps described herein may each occur in an automated fashion without user invention. In embodiments, the receiving, the detecting, the determining, the modifying, and the processing steps described herein may be carried out by an internal stream computing management module maintained in a persistent storage device of a computing node that hosts the stream computing environment. In certain embodiments, the steps described herein may be carried out by a stream computing management module located separately from the computing node that includes the stream computing environment. For instance, the stream computing management module may be hosted by a remote computing device that is accessible to the stream computing environment (e.g., through a subscription, usage-based, or other service model).

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a stream computing environment, the method comprising:
    defining a subgraph of a stream computing environment as a consistent region through which a stream of tuples of inbound data records is processed, the consistent region including a set of operators for processing the stream of tuples, wherein each tuple in the stream, when downstream from the consistent region and prior to being processed by a downstream operator, exhibits a behavior according to each operator in the consistent region;
    receiving an operator modification request to cause operators within the stream computing environment to revise a first attribute value of the tuples of inbound data records to a second attribute value;

identifying a subset of operators in the consistent region affected by the operator modification request;

identifying, from the stream of tuples, a set of tuples in the consistent region having the first attribute value;

determining a tuple adjustment action to modify the first attribute value of the set of tuples to the second attribute value;

modifying the subset of operators according to the operator modification request; and taking the tuple adjustment action on the set of tuples;

wherein:

the consistent region is configured to reduce data loss as a result of software error events and hardware failure;

the set of tuples includes each tuple processed by the set of stream operators prior to modifying the set of stream operators; and taking the tuple adjustment action includes performing a switchover action by marking the set of tuples to indicate processing by the set of stream operators prior to modifying the set of stream operators according to the operator modification request.

2. The method of claim 1, wherein:

the operator modification request includes an initiation of updating a set of operating code of the operators within the stream computing environment; and modifying the subset of operators includes updating the set of operating code of the subset of operators.

3. The method of claim 1, wherein taking the tuple adjustment action includes:

hot-fixing the set of tuples within the consistent region using a data capture-and-replay operation.

4. The method of claim 1, wherein taking the tuple adjustment action includes:

holding the set of tuples while the subset of operators is modified; and processing the set of tuples exiting the consistent region after the subset of operators is released.

5. The method of claim 2, wherein the tuple adjustment action includes:

reprocessing, in response to updating the set of operating code of the subset of operators, a set of downstream tuples located with respect to a farthest-upstream operator of the set of operators.

6. The method of claim 1, wherein identifying the set of tuples having the first attribute value includes:

identifying unaffected tuples having no indication of processing by the set of operators for which the operator modification request is directed; and determining to disregard updates to the set of stream operators for the unaffected tuples.

7. The method of claim 1, further comprising:

identifying exit order relevance for the set of tuples in the consistent region, the exit order relevance being indicated by tags associated with the set of tuples;

determining to disregard an exit order of the set of tuples when exiting the consistent region based on the tags indicating to disregard the exit order.

8. The method of claim 2, further comprising:

identifying exit order relevance for the set of tuples in the consistent region, the exit order relevance being indicated by tags associated with the set of tuples;

determining to maintain an exit order of the set of tuples when exiting the consistent region based on the tags indicating to maintain the exit order;

wherein:

maintaining the exit order includes examining the set of tuples to identify an order tag associated with each tuple that indicates a desired exit-order.

9. The method of claim 1, wherein the operator modification request includes:

generating a new group of stream operators corresponding to a subset of the set of stream operators; and responsive to generating the new group, switching, in a dynamic fashion, processing from the subset of the set of stream operators to the new group of stream operators.

10. The method of claim 1, wherein the operator modification request includes:

a change to the set of stream operators which alters a count of the set of stream operators within the consistent region of the stream computing environment.

11. A system for managing a stream computing environment, the system comprising:

a memory having a set of computer readable computer instructions, and a processor for executing the set of computer readable instructions, the set of computer readable instructions including:

defining a subgraph of a stream computing environment as a consistent region through which tuples of inbound data records are processed, the consistent region including a set of operators for processing the tuples, wherein each tuple, when downstream from the consistent region and prior to being processed by a downstream operator, exhibits a behavior according to each operator in the consistent region;

receiving an operator modification request to cause certain operators to revise a first attribute value of the tuples of inbound data records to a second attribute value;

identifying a subset of operators in the consistent region affected by the operator modification request;

identifying, from the stream of tuples and within the consistent region, a set of tuples having the first attribute value;

determining a tuple adjustment action to modify the first attribute value of the set of tuples to the second attribute value;

modifying the set of stream operators according to the operator modification request; and taking the tuple adjustment action on the set of tuples wherein:

the consistent region is configured to reduce data loss as a result of software error events and hardware failure;

the set of tuples includes each tuple processed by the set of stream operators prior to modifying the set of stream operators; and taking the tuple adjustment action includes performing a switchover action by marking the set of tuples to indicate processing by the set of stream operators prior to modifying the set of stream operators according to the operator modification request.

12. A computer program product for managing a stream computing environment, the computer program product comprising a computer readable storage medium having program instructions embodied therewith, wherein the computer readable storage medium is not a transitory signal per se, the program instructions executable by a processor to cause the processor to perform a method comprising:

defining a subgraph of a stream computing environment as a consistent region through which tuples of inbound data records are processed, the consistent region including a set of operators for processing the tuples, wherein each tuple, when downstream from the consistent region and prior to being processed by a downstream operator, exhibits a behavior according to each operator in the consistent region;

receiving an operator modification request to cause certain operators to revise a first attribute value of the tuples of inbound data records to a second attribute value;

identifying a subset of operators in the consistent region affected by the operator modification request;

identifying, from the stream of tuples and within the consistent region, a set of tuples having the first attribute value;

determining a tuple adjustment action to modify the first attribute value of the set of tuples to the second attribute value;

modifying the set of stream operators according to the operator modification request; and taking the tuple adjustment action on the set of tuples wherein:

the consistent region is configured to reduce data loss as a result of software error events and hardware failure;

the set of tuples includes each tuple processed by the set of stream operators prior to modifying the set of stream operators; and taking the tuple adjustment action includes performing a switchover action by marking the set of tuples to indicate processing by the set of stream operators prior to modifying the set of stream operators according to the operator modification request.

13. The method of claim 1, wherein:
the tuple adjustment action is taken responsive to the set of stream operators being modified; and
the tuple adjustment action includes dynamically reconfiguring the set of tuples to modify respectively corresponding first attributes of the set of tuples.

14. The system of claim 11, wherein the set of computer readable instructions further includes:
holding the set of tuples while the subset of operators is modified; and
processing the set of tuples exiting the consistent region after the subset of operators is released.

15. The computer program product of claim 12, further causing the processor to perform a method comprising:
holding the set of tuples while the subset of operators is modified; and
processing the set of tuples exiting the consistent region after the subset of operators is released.

16. The system of claim 11, wherein the set of computer readable instructions further includes:
identifying exit order relevance for the set of tuples in the consistent region, the exit order relevance being indicated by tags associated with the set of tuples;
determining to disregard an exit order of the set of tuples when exiting the consistent region based on the tags indicating to disregard the exit order.

17. The computer program product of claim 12, further causing the processor to perform a method comprising:
identifying exit order relevance for the set of tuples in the consistent region, the exit order relevance being indicated by tags associated with the set of tuples;
determining to disregard an exit order of the set of tuples when exiting the consistent region based on the tags indicating to disregard the exit order.

18. The system of claim 11, wherein the set of computer readable instructions further includes:
identifying exit order relevance for the set of tuples in the consistent region, the exit order relevance being indicated by tags associated with the set of tuples;
determining to maintain an exit order of the set of tuples when exiting the consistent region based on the tags indicating to maintain the exit order;
wherein:
maintaining the exit order includes examining the set of tuples to identify an order tag associated with each tuple that indicates a desired exit-order.

19. The computer program product of claim 12, further causing the processor to perform a method comprising:
identifying exit order relevance for the set of tuples in the consistent region, the exit order relevance being indicated by tags associated with the set of tuples;
determining to maintain an exit order of the set of tuples when exiting the consistent region based on the tags indicating to maintain the exit order;
wherein:
maintaining the exit order includes examining the set of tuples to identify an order tag associated with each tuple that indicates a desired exit-order.

20. The system of claim 11, wherein the set of computer readable instructions further includes:
the tuple adjustment action is taken responsive to the set of stream operators being modified; and
the tuple adjustment action includes dynamically reconfiguring the set of tuples to modify respectively corresponding first attributes of the set of tuples.

* * * * *